United States Patent [19]

Schwarz

[11] Patent Number: 4,662,762
[45] Date of Patent: May 5, 1987

[54] ADJUSTABLE CIRCULATING ROLLER BODY STRAIGHT-LINE GUIDE

[75] Inventor: Walter Schwarz, Pfronten, Fed. Rep. of Germany

[73] Assignee: MAHO Werkzeugaschinenbau Babel & Company, Pfronten/Allgau, Fed. Rep. of Germany

[21] Appl. No.: 750,469

[22] Filed: Jul. 1, 1985

[30] Foreign Application Priority Data

Aug. 14, 1984 [DE] Fed. Rep. of Germany ....... 3429897

[51] Int. Cl.⁴ .......................... F16C 29/06; F16C 29/12
[52] U.S. Cl. ........................................ 384/25; 384/38; 384/40; 384/44; 384/57
[58] Field of Search ............... 308/3 R, 3 A, 6 R, 6 C; 384/43–45, 49, 50, 57, 42, 25, 40, 26, 7, 38

[56] References Cited

U.S. PATENT DOCUMENTS 3,161,449 12/1964 Flom ............................... 308/6 R X
3,389,625 6/1968 Wagner .......................... 308/6 R X
4,120,538 10/1978 Headen ................................. 308/6 C
4,486,054 12/1984 Oetjen et al. ........................ 308/6 C
4,527,840 7/1985 Mugglestone et al. .............. 308/6 C

FOREIGN PATENT DOCUMENTS 1968859 4/1968 Fed. Rep. of Germany .
3228762 2/1984 Fed. Rep. of Germany .
1073668 9/1954 France .
849239 9/1960 United Kingdom .

Primary Examiner—Stuart S. Levy
Assistant Examiner—David Werner
Attorney, Agent, or Firm—Lahive & Cockfield

[57] ABSTRACT

The subject matter of the invention is an adjustable straight-line guide for, more particularly, machine tools, whose guide shoe, in order to obtain improved frictional properties while reducing the "stick-slip" effect with high vibration-damping characteristics, has roller circulation combined with a sliding surface and for automatic alignment in respect to the sliding surface of the guide path, and also for initial stressing which is simple to effect, is held by adjusting elements, acting multi-axially, at the guided machine part.

6 Claims, 4 Drawing Figures

ADJUSTABLE CIRCULATING ROLLER BODY STRAIGHT-LINE GUIDE

TECHNICAL FIELD OF THE INVENTION

The invention relates to an adjustable circulating roller body straight-line guide, especially for machine tools, of the kind specified in the description therein.

BRIEF DESCRIPTION OF THE PRIOR ART

The object of straight-line guides, more particularly in the case of machine tools, is to keep the structural parts executing the feed movements, such as sliding carriage, spindle head and the like, in an exact motion path and also to bear the weight of sliding carriage and work piece to take up the operational forces with as little vibration as possible. For this reason, the guide paris must have sufficient stability and high antivibration properties vertical and parallel to the guide path. These demands are met, in a particularly favourable manner, by straight-line guides which, however, have the disadvantage of a comparatively large co-efficient of friction with correspondingly high driving forces and, furthermore, the disadvantage of the so-called "stick-slip" effect which is to be attributed to the sudden change in the coefficient of friction with the change-over from static friction to sliding friction and which is disadvantageously noticeable, more particularly, in the case of the smallest feed movements. A further disadvantage lies in the fact that the sliding bearings cannot be prestressed against or with respect to each other in pairs so that when their sliding surfaces and the guide path are produced, the highest level of precision in processing must be preserved. In the case of large operational loads, a degree of clearance, which is to be attributed to the elastic deformation of the individual parts of the guide, results at the guide of a guide pair. In order to reduce the co-efficient of friction, often special sliding coverings of synthetic material or composite materials are used, having open oil grooves, in order to be able to exploit the hydrostatic carrying effect of the oil pressed therein. In practice, however, it has appeared that with long-term operation the material sof these sliding coverings swell, adversely affecting the smooth running and also the precision of the guide. Guiding errors, caused by inaccurate processing and/or swelling of the sliding coverings, can only be overcome by disassembly and reconditioning of the guides which have to be demounted from the machine tool at great operational expense.

Various embodiments of circulating roller body straight-line guides of the kind specified, with which the rolling bodies are guided in a circulation track or patch extending in a guide shoe either in the form of a closed loop in the supporting surface or as an endless path, vertical to the guide surface, are known from French Patent Specification 1,073,668. In the last-named embodiment a cut-out forming a portion of the rolling body circulation track is provided in the sole of the guide shoe. The guide shoes of this known straight-line guide can have a spherical rear surface against which rests an adjusting wedge with a correspondingly hollow-shaped countersurface. Through axial adjustment movements of the wedge, preselected initial stress of the guide pair can be achieved with automatic positional alignment of the guide shoe with the counter-guide surface. These known rolling guides stand out on account of high levels of precision of guidance, high levels of carrying capacity, adjustability and readjustability, ease of operation and on account of low levels of starting friction with no "stick-slip" effect. Their disadvantage, however, lies in insufficient vibration-damping and this is experienced, more particularly in the case of high loads, in the form of undesirable vibrations.

A bearing with ball guide is known from German Gebrauchsmuster No. 1,968,859, in which a plurality of balls is arranged in a comparatively long cage bushing, which is preferably made of synthetic material, in such a way that the balls rest on the inside against the one cylindrical machine part and on the outside against a steel bushing which is comparatively mobile axially. In this way, axial relative movements result once between the inner cylindrical structural part, the bearing bushing containing the ball and the steel bushing, in which case the extent of feed of the central bearing bushing is half as great as the total axial movement between the cylindrical inner portion and the outer steel bushing.

Finally, a rolling bearing for mounting a structural part in a longitudinally mobile manner, with a straight running path, in which a roller body circulation path is arranged in a cylindrical guide shoe which has two diametrically opposite cut-outs forming the straight sections of the running path, is known from German Offenlegungsschrift No. 32 28 762. The cylindrical guide shoe is inserted into a cylinder bore hole, which is open on the one side, in a housing, the longitudinal axis of the guide shoe inclining slightly towards the axis of the cylinder bore hole. This known bearing can, it is true, be mounted with initial stress in a simple manner with no additional structural parts which affect the overall height, yet it does have the disadvantages, which are peculiar to all types of rolling bearing, of a low level of vibration-damping which is too low for certain cases of application.

Straight-line guides have already been built as combined sliding—rolling guides for, for example, the rest of vertical turret boring machines (firm of Schiess AG, Dusseldorf), in which in each case separate sliding shoes and roller circulation shoes having their own guide paths are used, in order to exploit the advantages of sliding bearings and roller bearings. This calls for considerable expense when producing the various guide paths and also tedious work when adjusting the whole guiding system. In addition, the disadvantages of the sliding guides mentioned in the introduction cannot be eliminated.

OBJECT OF THE INVENTION

The object of the invention is to create a straightline guide for, more particularly, the moving parts of machine tools, which, in a constructionally simple manner combines the respective advantages of sliding guides and of rolling guides without the disadvantages specific to their type, that is, which, depending on the type and size of the load to be taken up, has the characteristic features of sliding guides and of rolling guides.

SUMMARY OF THE INVENTION

This object is achieved according to the invention by the characterising features of the invention disclosed herein.

The combination of the roller body circulation track with a sliding surface results in a distribution of the load to be taken up by the guide elements to the rolling body circulation track and also to the sliding surface, whereby the specific advantages of both concepts of guidance are brought forth simultaneously, without their respective disadvantages being of practical consequence. This load distribution can be affected by corresponding development of the roller circulation track in the guide shoe, that is, by the rollers projecting to a more or less great extent above the sliding surface, subject to the spring characteristic of the guide shoe, that is, in accordance with the initial stressing force desired in each case.

An advantageous arrangement of the invention according to the description herein offers the advantage that by moving the adjusting bolt axially by means, for example, of an adjusting screw, the desired initial stress is applied and that at the same time automatic positional adaptation of the guide shoe to the countersurface of the guide path takes place. The spherical rear surface of the guide shoe known as such in conjunction with the arched countersurface of the wedge forms a cylindrical socket bearing which renders possible adjustment movement of the guide shoe about an axis extending crosswise in respect of the longitudinal axis of the sliding shoe and parallel to the sliding surface. The cylindrical shape of the adjusting bolt and its exact fit in the bore hole of the machine part permits turning movements of the sliding shoe about the longitudinal axis of the bolt, and the double wedge, finally in the case of axial movements of the bolt, produces in-feed movements of the guide shoe, vertical to the countersurface.

For technical reasons of production, the guide shoe is advantageously constructed so that it is divided longitudinally and is coated on its sole with a sliding covering. The two-part development of the guide shoe renders possible simple incorporation of the guide path, in which case after the roller bodies or rollers which are supported with respect to each other by cages, have been inserted, the two guide shoe portions are fixedly connected with each other before the sliding covering is put on the sole.

BRIEF DESCRIPTION OF THE DRAWINGS

An exemplary embodiment of the invention is described in the following in detail with the aid of the drawing.

DETAILED DESCRIPTION OF THE PREFERRED EMBODIMENTS OF THE INVENTION

Figure 1:
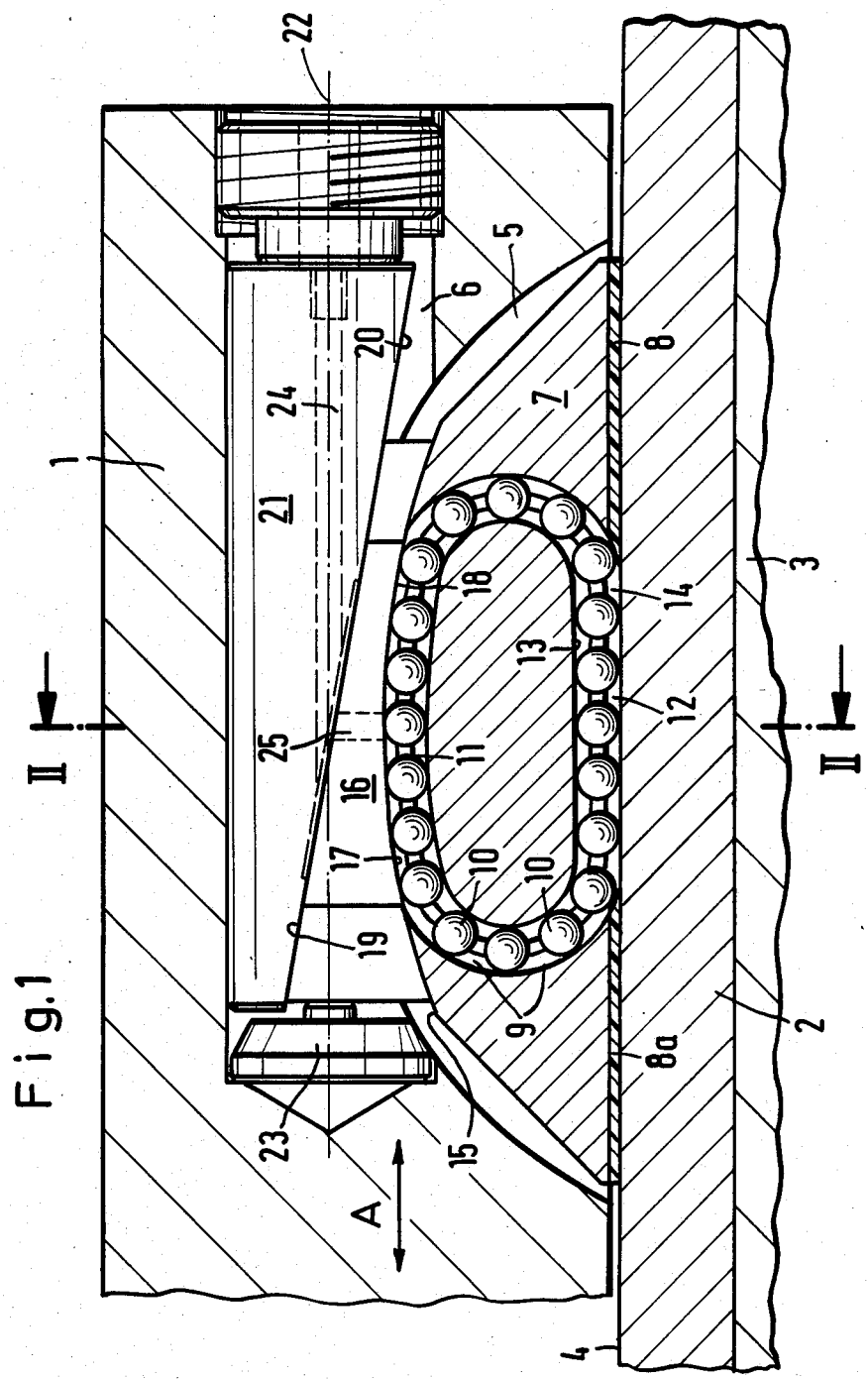
FIG. 1 shows a longitudinal section through the straight-line guide according to the invention.

According to FIG. 1, a movable structural part 1 of a machine tool, for example, a rest, a sliding carriage or a spindle head, is transported in the directions of the double arrow A on a guide path 2 of a fixed structural part 3 linearly in both directions. The guide path 2, as a rule, is made of hardened steel and has a finely machined, for example ground, guide or sliding surface 4. A recess 5, into which opens an adjusting bore hole 6 extending horizontally in the drawing, is developed in the structural part 1. In the case of the embodiment represented, the recess 5 has a partly cylindrical shape and opens towards the sliding surface 4 of the guide rail 2. A guide shoe 7, which is coated on its sole with a sliding covering 8, is located in this recess 5. The sliding shoe 7 is set in the recess 5 of the structural part 1 with free allround intermediate spacing and a large area of it rests with the sliding surface 8a of the sliding covering 8 against the sliding surface 4 of the guide path 2. Inside the guide shoe 7, an endless roller circulation track 9 is developed, extending in the plane of projection, in which a plurality of rollers 10 held in cages 11 circulate. The lower portion 12 of the roller circulation path is developed in a straight line and extends exactly parallel to the sliding surface 8a of the covering 8. The arrangement of this portion 12 of the circular track 9 is then such that the rollers 10 lie whilst being supported at the inner surface 13 of the circulation track 9, 12—in the prestressed state—with their outwardly pointing peripheral portion substantially in the plane of the sliding surface 8a of the covering 8. By this means, a situation is reached where, when loading the structural part 1, vertical, for example, to its direction of movement A, the rollers 10 located in the portion 12 of the path are pressed through the cut-out 14 against the sliding surface 4 of the guide path 2 and the sliding covering 8 together with the rollers 10 co-operate in taking up the load.

As represented, the guide shoe 7 has a spherical—in this case arcuate—rear surface 15, against which a wedge 16 rests with its correspondingly arched countersurface 17. The roller circulation track 9 is then directed in such a way that even in this rear surface 15 a cutout 18 results so that the rollers 10 located in this rearward—upper—section of the roller circulation path 9 rest against and roll along the arched surface 17 of the wedge 16. The upper inclined surface 19 of the wedge 16 is arranged close to a lower, correspondingly sloping inclined surface 20 of an adjusting bolt 21 which fits exactly into the bore hole 6 in the structural part 1 and which can be turned about its longitudinal axis 22 even under load. At the end of this adjusting bolt 21 on the right in FIG. 1, there is an adjusting and prestressing arrangement in, for example, the form of adjusting nuts, through the manipulation of which the adjusting bolt 21 can be shifted in the longitudinal direction. In the end of the bore hole 6 on the left in FIG. 1, there is a countersupport 23 for the wedge 16.

Figure 2:
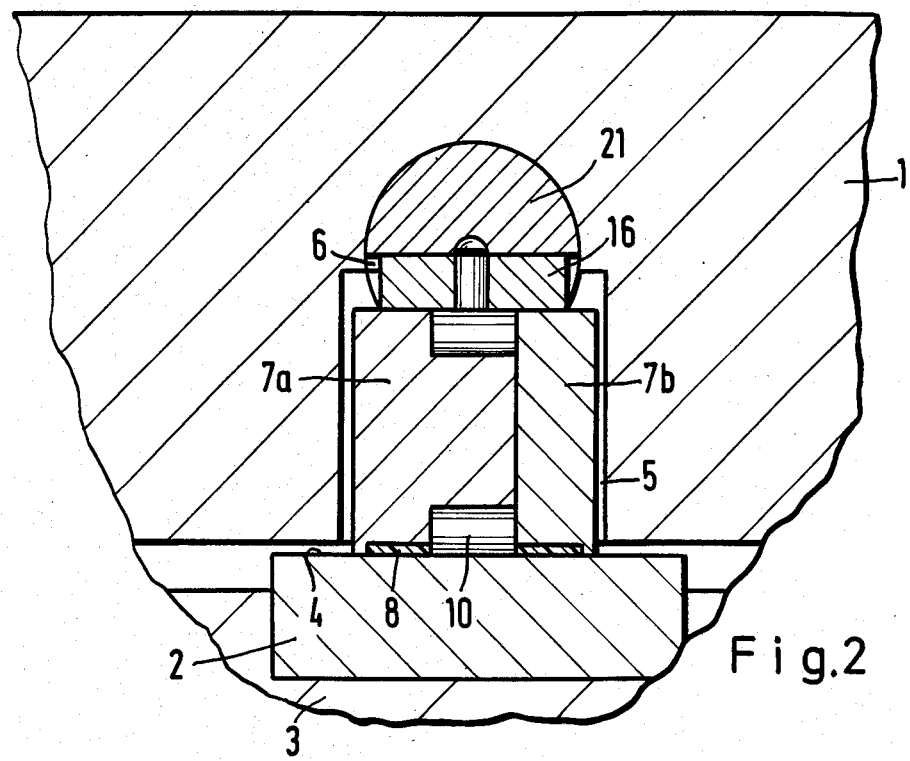
FIG. 2 shows the straight-line guide in the cross section II—II of FIG. 1.

As is evident more particularly from FIG. 2, the guide shoe 7 is divided longitudinally, the plane of division 25 coinciding with one of the end walls of the roller circulation path. The two portions 7a, 7b are fixedly connected with each other by suitable means by, for example, tension bolts, that is, before the guide shoe 7 undergoes fine machining and before the covering 8 is applied. The guide shoe 7 has a rectangular cross section, in which case the roller circulation path 9 extends in the form of an endless loop developed vertically in the shoe 7. For the purposes of lubricating the roller path, the sliding surfaces and also the adjusting surfaces, channels for lubricants 24, 25 are provided in the bolt 21 and also in the wedge 16.

Figure 3:
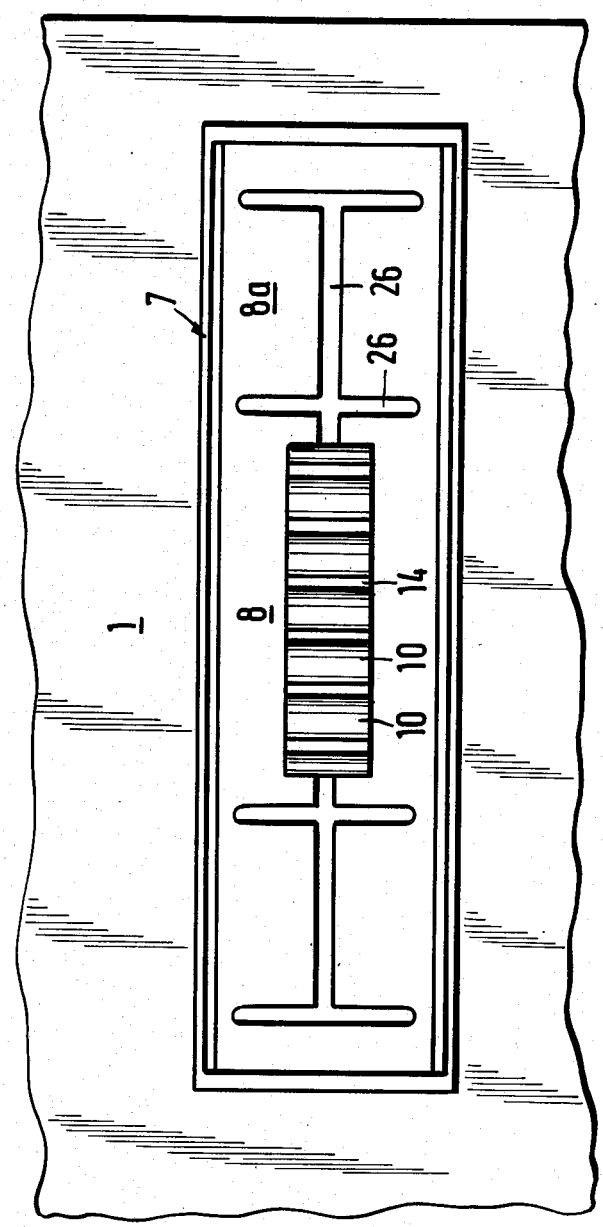
FIG. 3 shows a view of the sliding surface of the guide shoe according to FIG. 1.

The configuration of the roller path cut-out 14 in the sole of the guide shoe 7 together with lubricant grooves 26 in the sliding covering 8 is represented in FIG. 3. The rollers 10 are held so that there is intermediate spacing by means of the cage 11 in the usual manner, in which case the length and breadth of this cut-out and also the size and number of rollers 10 can be selected according to the requirements of the application.

The straight-line guide described above operates as follows:

When the straight-line guide is assembled, a flat location of the guide shoe 8 at the sliding surface 4 of the guide path 2 results, because the guide shoe 7 can be turned through sliding shifting movements at the two spherical surfaces 15, 17 about an axis extending crosswise in respect of the plane of projection and also, in addition, about the central axis 22 of the adjusting bolt 21. In order to attain the previously identified initial stress, the adjusting bolt 21 is shifted axially through external manipulation of the adjusting nuts, whereby, the wedge 16 and with this the sliding shoe 7, is pressed in the direction of the sliding surface 4 of the guide path 2. The extent of initial stress and with that the amount of adjustment of the bolt 21 are determined in a known way in accordance with the spring characteristic of the straightline guide and the size of the loads to be taken up.

Figure 4:
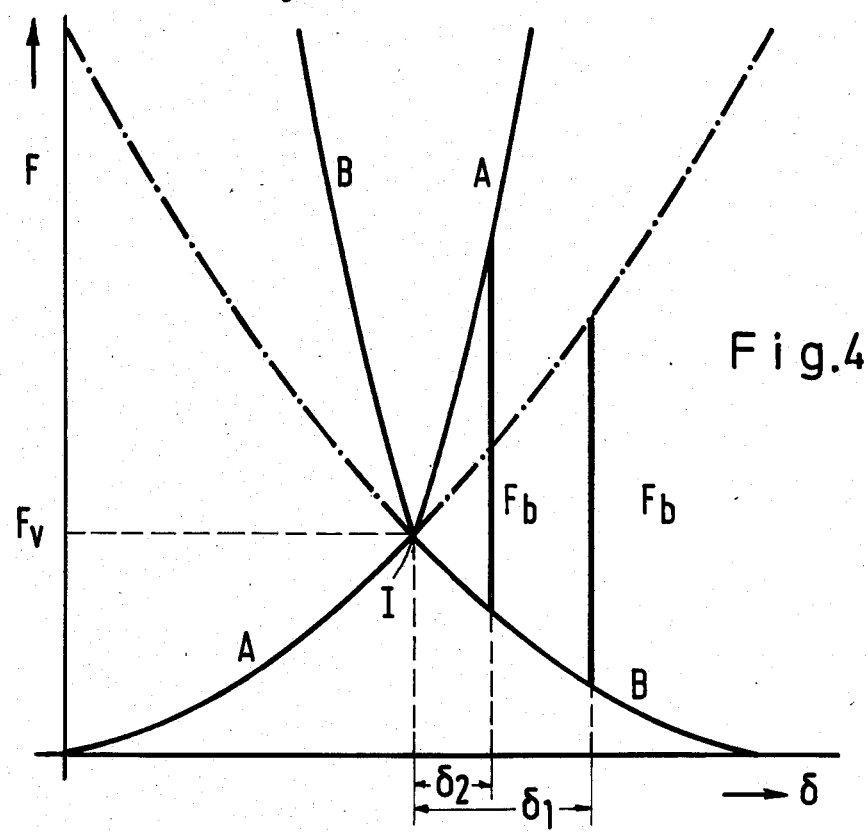
FIG. 4 shows a graphical representation of the initial stress of two straight-line guides prestressed against each other.

The specific charcteristic features of the straightline guide according to the invention can be clearly inferred from the initial stress graphical representation of two guide shoes prestressed against each other according to FIG. 4. The force F is plotted on the ordinate and the elastic deformation $\beta$ is plotted on the abscissa. the continuous curves A and B represent the spring or elasticity characteristic curves of the one and of the other guide shoe. For the purposes of comparison, the corresponding spring characteristic curves of two roller circulation shoes are also represented as curves in dot-dash lines. The two guide shoes are prestressed against each other with an initial stressing force $F_V$. In the example represented, the initial stressing force $F_V$ is chosen so that the sliding surface of the guide shoes, in the case of an increase in load, starts to take the strain as well exactly at that point. This state prevails at the point of intersection I at which the two curves A and B have a kink and their upper portion extends from this with greater steepness. The steeper course of the curve is given owing to the fact that from the point I, up to which the forces are only taken up by the circulating rollers, the sliding surface co-operates in taking up the load as well. While the portion of the curves A, B which is lower in each case as far as the point I thus marks the take-up of load—and with that the rigidity— just by the rollers which project slightly above the sliding surface, the upper portions of the curve from the point I indicate the joint take-up of load by rollers and sliding surface of the respective guide shoe according to the invention. An essential feature of the invention is the fact that the new straight-line guide has, in the case of higher operational loads, considerably greater rigidity than conventional roller circulation shoes, as follows likewise from FIG. 4. As represented, a conventional, prestressed straight-line guide with roller circulation deforms under an operational load f, by the amount $\beta_1$. the straight-line guide according to the invention, however, deforms, regarding the steeper curves A or B, just by the amount $\beta_2$. With the greater rigidity, however, the friction does not increase to the same extent, because the straight-line guide which is relieved of the load in each case—lower portion of the curve B—bears that portion of the operational load $F_b$ falling to it just with the rollers. The good vibration-damping effect is to be attributed to the sliding surface take-up of load of the other guide—upper portion of the curve A.

As a result of the ability to choose freely in respect of load distribution between rolling and sliding friction, the straight-line guides according to the invention can be optimally adapted to special operating conditions or special machine parts. This was not possible with previous straight-line guides.

The invention is not restricted to the exemplary embodiment represented. The roller circulation track need not extend vertically in the manner represented, but the whole endless circular track can also be arranged in an exclusively horizontal manner in the lower portion of the guide shoe, with two cut-outs parallel to each other and arcshaped end by-pass for the rollers. In the case of this embodiment, the guide shoe can also be constructed in one piece, because the roller circulation track can be worked in from the surface of the sole. Finally, it is also possible to arrange the bore hole 6 and therewith also the adjusting bolt 21 crosswise in respect of the direction of movement A of the machine part 1. This would, however, also result in a position for the two arched surfaces 15, 17 turned through 90°.

What is claimed is:

1. An adjustable circulating roller body straight-line guide, especially adapted for use in machine tools, wherein said adjustable circulating roller body straight-line guide has a roller circulation shoe which comprises a roller circulation track and a plurality of roller bodies, said roller circulation track including a cut-out portion, a track portion, and at least one sliding surface, said roller circulation shoe being held in place in a machine part by an initial stress and adjusting means which is adjustable about three orthoganal axes,
   whereby said roller bodies and said sliding surface are arranged in the same plane so that said roller bodies project beyond said sliding surface by a predetermined, selectable amount.

2. An adjustable circulating rolling body straight-line guide according to claim 1 characterized that said initial stress and adjusting means comprises a wedge, an adjusting bolt and a bore hole, said wedge having an arched countersurface and said adjusting bolt having an inclined front surface and a longitudinal axis extending parallel to said sliding surface; and said roller circulation shoe, which includes a spherical rear surface, fits into a recess which is provided in said machine part;
   whereby the spherical rear surface of said wedge edgages said arched countersurface and said adjusting bolt is fitted into said bore hole so as to be rotatable about said longitudinal axis, said wedge further engaging said inclined front surface of said adjusting bolt to permit easy adjustment of said adjusting circulating roller body straight-line guide.

3. A circulating roller body straight-line guide according to claim 1, characterised in that an adjusting nut is applied to adjust the initial stress at said adjusting bolt.

4. An adjustable circulating roller body straight-line guide according to claim 1, 2, or 3, characterized in that said roller body circulation track extends vertically relative to said sliding surface in said roller circulation shoe.

5. An adjustable circulating roller body straight-line guide according to claim 4, characterized in that said roller circulation shoe is divided longitudinally in the region of said roller body circulation track.

6. An adjustable circulating roller body straight-line guide according to claim 5 characterized in that said shoe is coated with a sliding covering at said sliding surface and oil grooves are provided in said sliding surface.

* * * * *

UNITED STATES PATENT AND TRADEMARK OFFICE
CERTIFICATE OF CORRECTION

PATENT NO. : 4,662,762
DATED : May 5, 1987
INVENTOR(S) : Walter Schwarz

Page 1 of 2

It is certified that error appears in the above-identified patent and that said Letters Patent is hereby corrected as shown below:

In the caption:

[73] Assignee: MAHO Werkzeugaschinenbau Babel & Company, Pfronten, Fed. Rep. of Germany Should read as follows:

[73] Assignee: MAHO Werkzeugmaschinenbau Babel & Company, Pfronten, Fed. Rep. of Germany At Column 1, line 9, delete "therein" and insert ---herein---.

At Column 1, line 15 delete "paris" and insert ---pairs---.

At Column 1, line 40 and 41 delete "material sof" and insert ---materials of---.

UNITED STATES PATENT AND TRADEMARK OFFICE
CERTIFICATE OF CORRECTION

PATENT NO. : 4,662,762
DATED : May 5, 1987
INVENTOR(S) : Walter Schwarz

It is certified that error appears in the above-identified patent and that said Letters Patent is hereby corrected as shown below:

At Column 5, line 25 delete "abscissa the" and insert -- abscissa. The --.

Signed and Sealed this

Eighteenth Day of August, 1987

Attest:

DONALD J. QUIGG

Attesting Officer     Commissioner of Patents and Trademarks